March 13, 1973 W. C. BENNETT 3,720,363

APPARATUS FOR OPERATING ON TAPE IN TAPE CARTRIDGES

Original Filed March 25, 1970

3 Sheets-Sheet 1

March 13, 1973 W. C. BENNETT 3,720,363

APPARATUS FOR OPERATING ON TAPE IN TAPE CARTRIDGES

Original Filed March 25, 1970

3 Sheets-Sheet 2

APPARATUS FOR OPERATING ON TAPE IN TAPE CARTRIDGES

Original Filed March 25, 1970

3 Sheets-Sheet 3

1

3,720,363
APPARATUS FOR OPERATING ON TAPE IN TAPE CARTRIDGES

William C. Bennett, Menlo Park, Calif., assignor to Novar Corporation

Original application Mar. 25, 1970, Ser. No. 22,619. Divided and this application Feb. 22, 1972, Ser. No. 227,757
Int. Cl. B65h 17/20
U.S. Cl. 226—51 4 Claims

ABSTRACT OF THE DISCLOSURE

An apparatus including a transducer and a capstan for operating on tape in a tape cartridge having means for receiving the cartridge and positioning the transducer with respect to the cartridge, guide means for guiding the tape past the transducer, drive means for reversibly driving the capstan whereby to move the tape past the transducer selectively in either direction, and sensing means for sensing the beginning and end of tape.

This is a division of Ser. No. 22,619 filed Mar. 25, 1970.

BACKGROUND OF THE INVENTION

This invention relates generally to apparatus for receiving and operating on tape in tape cartridges and more particularly to such apparatus for operating on magnetic tape and suitable for use in connection with recording and reproducing of digital data.

Apparatus of the prior art for use in connection with digital data recording and reproduction has, in general, been relatively complicated and expensive.

OBJECTS AND SUMMARY OF THE INVENTION

It is a general object of the present invention to provide an apparatus for operating on tape in tape cartridges which is simple in construction and relatively inexpensive.

The apparatus of the present invention includes a transducer and a capstan for engaging and driving tape in an associated cartridge past the transducer, drive means for selectively driving said capstan in either direction responsive to an electrical signal whereby to move the tape in either direction past the transducer, means for accurately positioning the transducer with respect to the cartridge whereby the transducer is in engagement with the tape, guide means for guiding the tape past the transducer and sensing means for sensing the beginning and end of tape.

BRIEF DESCRIPTION OF THE DRAWINGS

FIG. 7 is a rear sectional view taken along the line 7—7 of FIG. 4 showing the mechanism for reversibly driving the capstan.

DESCRIPTION OF THE PREFERRED EMBODIMENT

The apparatus of the present invention is designed to receive a cartridge of the type shown and described in copending application Ser. No. 886, filed Jan. 6, 1970. The cartridge described in said application houses a pair of coaxially disposed reels with the tape extending between the reels passing along an open end of the cartridge. The tape is maintained under substantially constant tension as it is transferred from one reel to the other in either direction.

2

Figures 1, 2, 3:
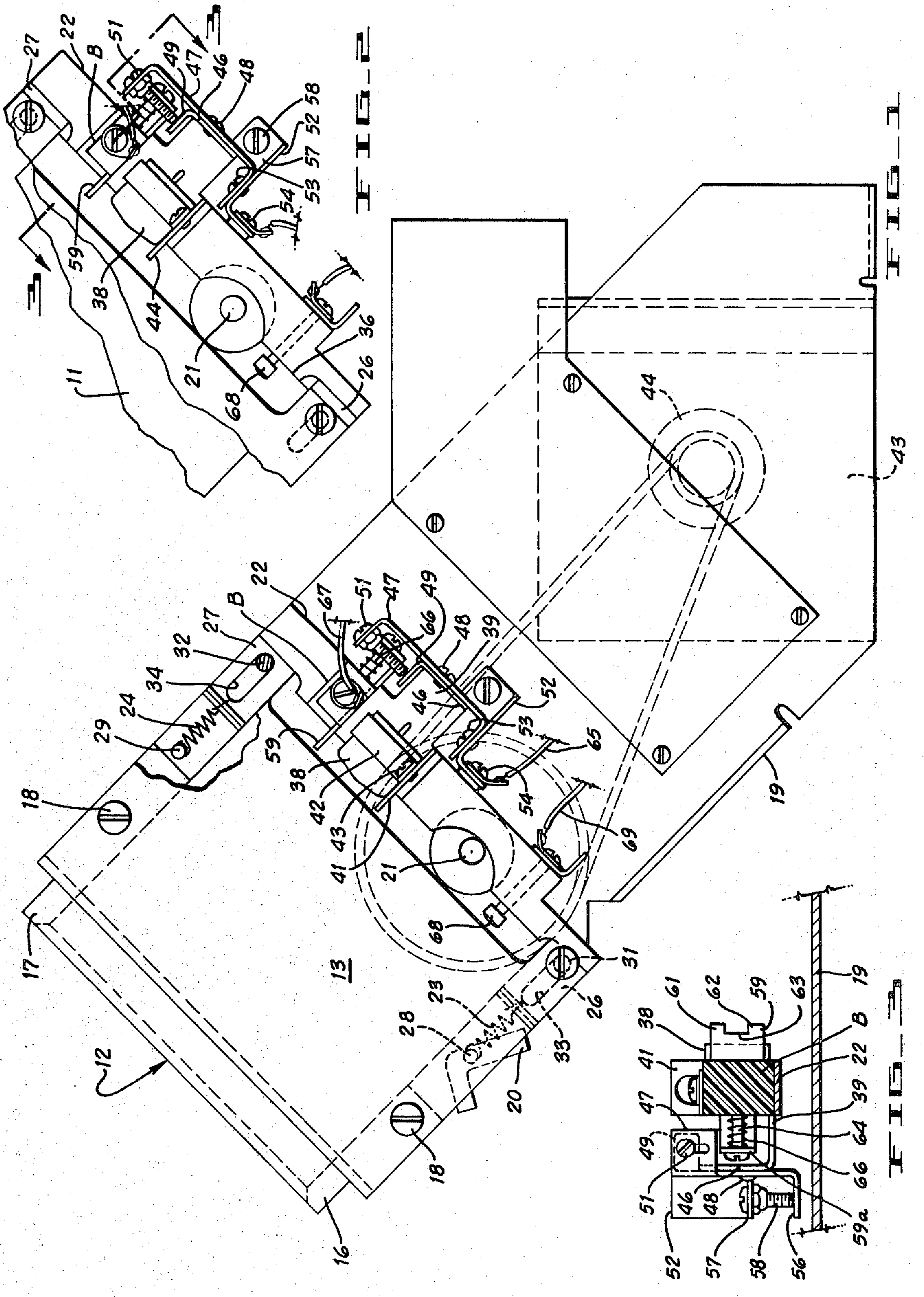
FIG. 1 is a front elevational view of the apparatus showing the capstan and transducer.
FIG. 2 is a partial view showing the transducer and capstan with a cartridge inserted in the apparatus.
FIG. 3 is a sectional view taken along the line 3—3 of FIG. 2.
Figure 2:
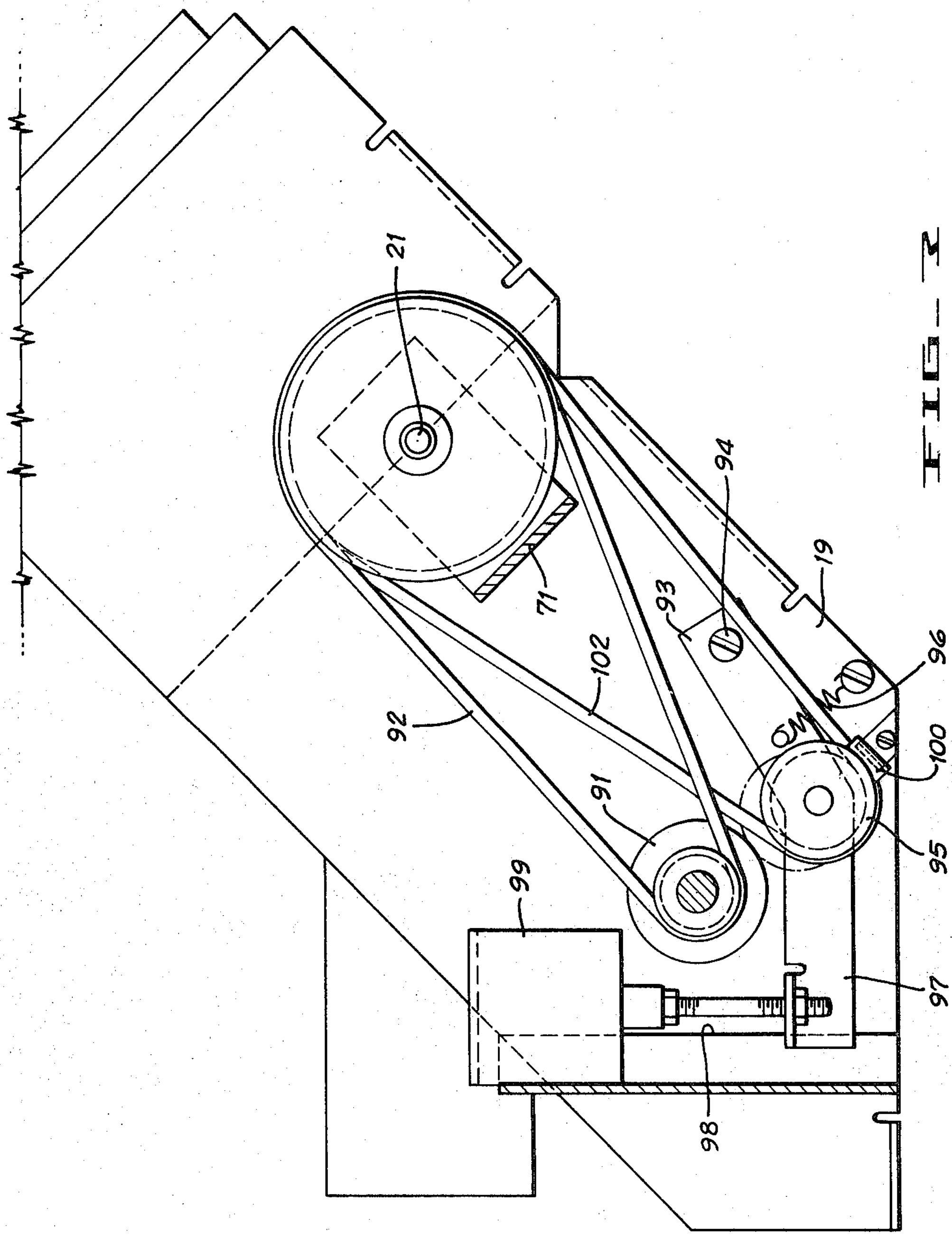
Figure 5:
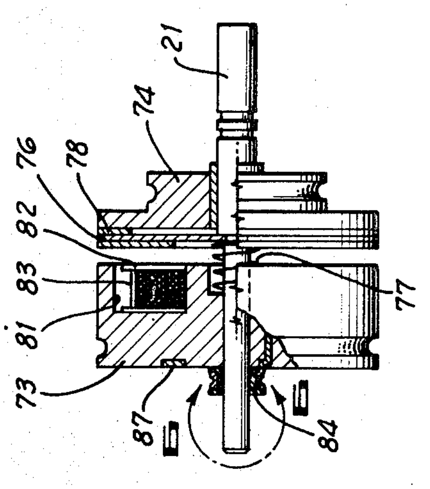
FIG. 5 is a view, partly in section, of the drive clutch associated with the capstan.
Figure 6:
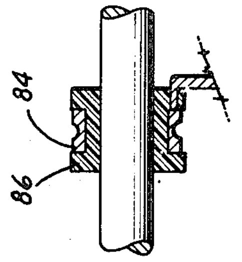
FIG. 6 is an enlarged view of the portion 6—6 of FIG. 5.

Referring to the drawing, FIGS. 1 and 2, the cartridge 11, FIG. 2, is received in a pocket 12 defined by a front wall 13, a back wall 14 (FIG. 4) and spaced side walls 16 and 17. The pocket includes two mating pieces held in assembled relationship by means of a plurality of screws 18 which are threadably received by the mounting member 19. The pocket serves to receive, guide and hold a cartridge in cooperative relationship with the transducer and capstan. An L-shaped latch 20 engages a notch in the cartridge to hold it in the pocket.

Capstan 21 extends through the mounting member 19 adjacent the lower end of the pocket to engage and drive the tape. The lower end of the pocket is closed by a bottom member 22 which is urged toward the bottom of the pocket by spaced springs 23 and 24. The member 22 includes fingers 26 and 27 which are received in slots formed in the sides 16 and 17. The ends of the fingers are engaged by the springs 23 and 24 which have their other ends secured to pins 28 and 29 fixed to the walls 16 and 17. Pins 31 and 32 ride in elongated openings 33 and 34 formed in the fingers to guide the fingers and bottom member 22. The bottom member 22 is seated against the end of the pocket when no cartridge is placed in the apparatus.

When a tape cartridge is inserted into the apparatus, the ends of the cartridge engage the member 22 as shown at 36, FIG. 2, and move the member downwardly whereby it is held against the end of the cartridge by means of the springs 23 and 24. This accurately positions the member 22 with respect to the cartridge.

The transducer 38 is adjustably mounted on the bottom member 22 whereby to control the orientation and position of the transducer. The mounting means includes a bracket 39 having an upstanding side 41 which rides against the side of the transducer. The transducer is held in place by a strap 42 secured at one end to the bottom of the bracket and at its other end to the side 41 by screw 43. The side 41 includes a pair of spaced fingers 44 which engage and guide the tape.

The bracket 39 includes an upstanding back 46 which is secured to member 47 by means of screw 48. The back 46 includes a tab 49 which threadably receives the screw 51 which extends through member 47. By threading the screw into the tab, the bracket is caused to rotate about the screw 48 to adjust the angular orientation of the transducer. The member 47 is adjustably secured to bracket 52 by means of screws 53. The bracket 52 is secured to the member 22 by means of screws 54. The member 47 and bracket 52 include tabs 56 and 57, respectively, which cooperate with screw 58 to raise and lower the member 47 whereby to adjust the level of the transducer with respect to the cartridge. Thus, there is provided means for positioning and orienting the transducer 38 with respect to the bottom member 22.

An electrically nonconductive block B secured to member 22 serves to mount a second tape guide 59. The guide includes spaced fingers 61 and 62 and a bottom 63. The back 59*a* of the guide is engaged by a screw 64 which is threadably received by block B on member 22. A spring 66 urges the guide back toward the head of the screw. The position of the bottom 63 is controlled by the screw 64 and, in turn, the angle and pressure with which the tape engages the transducer is controlled.

The end and beginning of tape is sensed by placing conductive coatings or strips on the tape near the beginning and end. The strips serve to complete a circuit between spaced members which engage the tape. In the present embodiment, the transducer forms one contact and is connected to the lead 65. The end of tape contact is formed by guide 59 connected to lead 67. The beginning of tape contact comprises probe 68 supported on member 22 and connected to lead 69.

Figure 4:
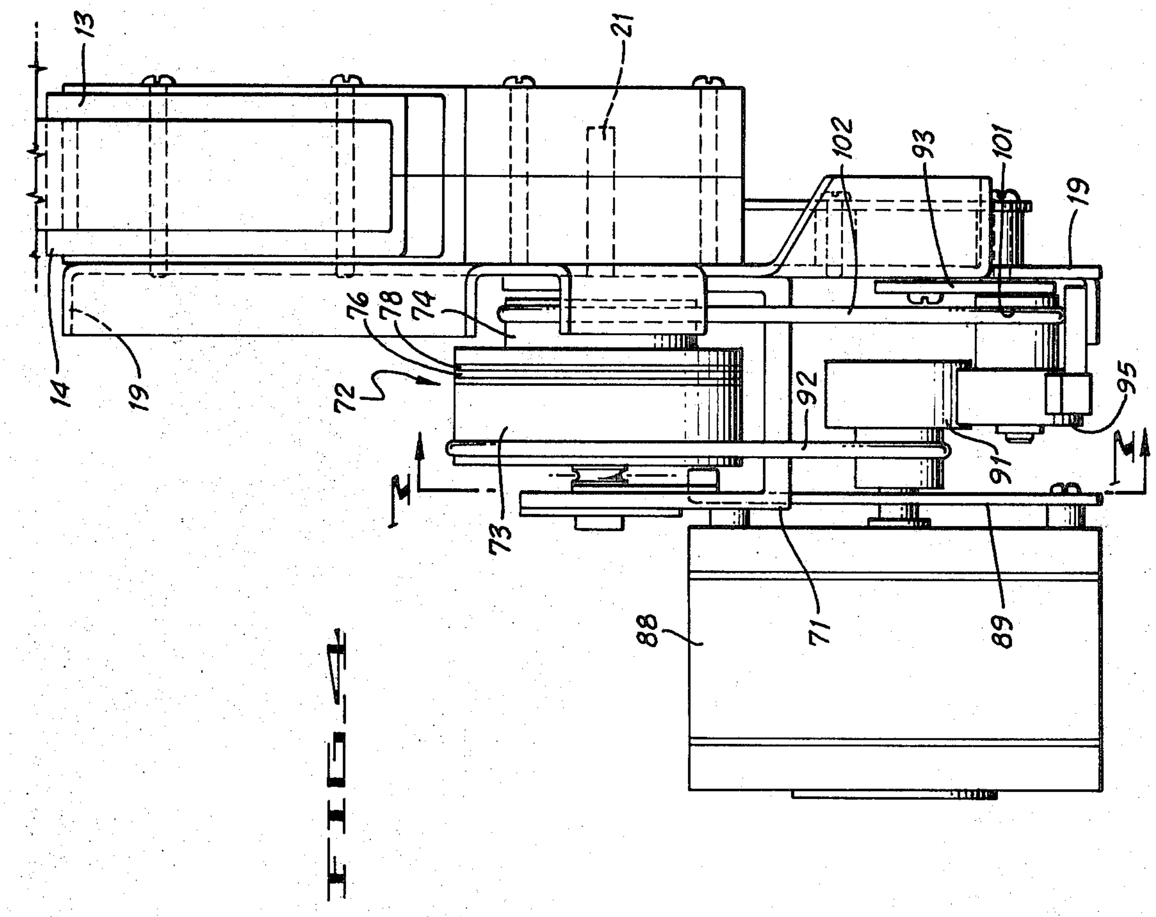
FIG. 4 is a side elevational view of the apparatus showing the capstan drive means.

The capstan is carried by the U-shaped member 71, FIG. 4, mounted on the mounting member 19 whereby the end extends adjacent the lower end of the cartridge pocket. A drive clutch assembly 72 is disposed in the U-shaped member 71 to cooperate with and drive the capstan.

The drive clutch assembly includes driven pulleys 73 and 74 which are rotatably mounted on the capstan shaft. A drive disc 76 is keyed on the shaft and urged towards the drive pulley 74 by the spring 77. A friction ring 78 is carried by the face of the pulley whereby rotation of the pulley frictionally drives the disc to drive the capstan shaft.

The drive pulley 73 includes a recess 81 which receives spool 82 which carries coil 83. One end of the coil is connected to commutator 84 carried by insulating sleeve 86 and the other end is connected to pulley 73. The electrical return path for coil 83 is completed through shaft 21 and bracket 71. When the coil is energized, the drive disc 76 is drawn toward the pulley 73 and is driven thereby to drive the capstan. The pulleys are driven in opposite directions whereby the capstan can be driven to drive the tape in the forward or rewind direction. In the preferred embodiment, the tape is driven in the forward direction when the coil is energized.

A motor 88 is carried on plate 89 which is secured to mounting plate 19. The motor shaft includes a motor pulley 91 having a groove adapted to receive drive belt 92 which engages a groove formed in drive pulley 73. If the coil 83 is energized, the capstan 21 is driven in one direction. The motor pulley 91 also cooperates with an idler pulley 95 mounted on a bracket 93 pivoted at 94. The pulley 95 is maintained out of engagement with the pulley 91 by means of spring 96 attached between the bracket 19 and bracket 93. The bracket 93 has an outwardly extending portion 97 which is engaged by the armature 98 of solenoid 99. When the solenoid is energized, the bracket is rotated and idler pulley 95 engages the motor pulley 91. Idler pulley 95 includes a groove 101 which is engaged by a belt 102 which also engages the drive pulley 74. Thereby, when the idler is brought against the motor pulley 91, the drive pulley is rotated in an opposite direction to that of pulley 73. Thus, it is seen that the capstan can be driven in either of two directions by suitable electrical control means which control energization of the coil 83 and the solenoid 99.

It can also be seen that when the drive disc 76 is urged into contact with friction ring 78 and when pulley 95 is pulled against stop 100 by spring 96, that capstan 21 is constrained from rotation thus providing a simple means of both braking rotational motion and preventing creepage of the tape in the cartridge.

Thus, it is seen that there has been provided a relatively simple apparatus for receiving a cartridge and reversibly driving the tape therein past the magnetic head to record, playback, rewind and brake tape motion.

What is claimed is:

1. A magnetic tape apparatus of the type including a transducer, a capstan for driving an associated tape past the transducer and means for selectively driving said capstan in either direction whereby the direction of tape travel past the transducer may be selectively controlled comprising a motor adapted to continuously drive a motor pulley, an electromagnetic clutch including forward and reverse driving pulleys rotatably mounted on said capstan, armature means for driving said capstan interposed between said pulleys and normally engaging one of said pulleys to be driven thereby, means for driving one of said drive pulleys from said motor pulley in a first direction, an idler pulley, means for driving the other drive pulley from said idler pulley, and means for selectively moving said idler pulley to engage the motor pulley whereby to drive the idler pulley and thereby the other drive pulley in the opposite direction, a coil carried by said clutch whereby when the coil is energized said armature means is moved toward the coil to engage the other drive pulley to drive the capstan in the opposite direction.

2. Apparatus as in claim 1 wherein said means for moving said idler pulley into engagement when the motor pulley includes a solenoid.

3. Apparatus as in claim 1 including means for receiving a tape cartridge and presenting the cartridge to said capstan and transducer.

4. Apparatus as in claim 1 introducing a braking surface and means for selectively moving an idler pulley against said braking surface.

References Cited

UNITED STATES PATENTS

| | | | |
|---|---|---|---|
| 3,051,406 | 8/1962 | Wehde | 226—51 X |
| 3,225,990 | 12/1965 | Barbeau | 226—51 |

RICHARD A. SCHACHER, Primary Examiner

UNITED STATES PATENT OFFICE
CERTIFICATE OF CORRECTION

Patent No. 3,720,363 Dated March 13, 1973

Inventor(s) William C. Bennett

It is certified that error appears in the above-identified patent and that said Letters Patent are hereby corrected as shown below:

Column 4, line 21, change "driving" to --drive--.

Column 4, line 40, change "introducing" to --including--.

Signed and sealed this 18th day of December 1973.

(SEAL)
Attest:

EDWARD M. FLETCHER, JR.
Attesting Officer

RENE D. TEGTMEYER
Acting Commissioner of Patents